(12) United States Patent
Gemignani, Jr.

(10) Patent No.: US 10,348,867 B1
(45) Date of Patent: Jul. 9, 2019

(54) ENHANCED PROTOCOL SOCKET DOMAIN

(71) Applicant: EMC Corporation, Hopkinton, MA (US)

(72) Inventor: John Gemignani, Jr., Bremerton, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 352 days.

(21) Appl. No.: 14/870,984

(22) Filed: Sep. 30, 2015

(51) Int. Cl.
G06F 15/177 (2006.01)
H04L 29/06 (2006.01)
H04L 29/08 (2006.01)

(52) U.S. Cl.
CPC ............ H04L 69/162 (2013.01); H04L 67/34 (2013.01)

(58) Field of Classification Search
CPC ..... H04L 29/06; H04L 63/0428; H04L 69/16; H04L 69/162; H04L 12/24; H04L 65/1069; H04L 29/12009; H04L 29/12358; H04L 29/06108; G06F 13/28; G06F 13/102; G06F 9/5027
See application file for complete search history.

(56) References Cited

U.S. PATENT DOCUMENTS

| | | | | |
|---|---|---|---|---|
| 5,537,417 A * | 7/1996 | Sharma | .................... | H04L 29/06 709/228 |
| 5,568,487 A * | 10/1996 | Sitbon | .................... | H04L 29/06 370/466 |
| 5,913,024 A * | 6/1999 | Green | ..................... | G06F 9/468 726/3 |
| 7,779,132 B1 * | 8/2010 | Chu | ........................ | H04L 69/16 709/223 |
| 9,137,270 B2 * | 9/2015 | F | .......................... | H04L 65/1069 |
| 2003/0061402 A1 * | 3/2003 | Yadav | ............... | H04L 29/12009 719/328 |
| 2004/0249957 A1 * | 12/2004 | Ekis | ........................ | H04L 69/16 709/228 |
| 2005/0013280 A1 * | 1/2005 | Buddhikot | ........ | H04L 29/12358 370/349 |
| 2005/0086359 A1 * | 4/2005 | Banerjee | ............... | G06F 9/5027 709/232 |
| 2005/0135361 A1 * | 6/2005 | Lim | ...................... | H04L 69/162 370/389 |
| 2005/0152361 A1 * | 7/2005 | Kim | ........................ | H04L 29/06 370/389 |

(Continued)

*Primary Examiner* — Dustin Nguyen

(74) *Attorney, Agent, or Firm* — Amin, Turocy & Watson, LLP

(57) ABSTRACT

An enhanced address domain is presented herein. A system can comprise a processor; and a memory that stores executable instructions that, when executed by the processor, facilitate performance of operations, comprising: creating an upper-layer socket of an enhanced address domain; allocating a protocol control block (PCB) and associating the PCB with the upper-layer socket—the PCB storing information representing a private state of the upper-layer socket; creating a lower-layer socket of an existing address domain—the lower-layer socket referenced from the upper-layer socket using the PCB; and installing upcall(s) on the lower-layer socket to be intercepted via the enhanced address domain. In an aspect, the upper-layer socket supports enhancement(s) to the existing address domain and a socket type of the lower-layer socket.

20 Claims, 11 Drawing Sheets

(56) References Cited

U.S. PATENT DOCUMENTS

| | | | |
|---|---|---|---|
| 2005/0276281 A1* | 12/2005 | Jones | H04L 69/16 370/469 |
| 2006/0190720 A1* | 8/2006 | Ozaki | H04L 63/0428 713/160 |
| 2009/0199216 A1* | 8/2009 | Gallagher | G06F 13/102 719/321 |
| 2009/0274045 A1* | 11/2009 | Meier | H04L 12/24 370/235 |
| 2015/0052280 A1* | 2/2015 | Lawson | G06F 13/28 710/308 |

* cited by examiner

ENHANCED PROTOCOL SOCKET DOMAIN

TECHNICAL FIELD

The subject disclosure generally relates to embodiments for an enhanced protocol socket domain.

BACKGROUND

Conventional server technologies utilize existing APIs to obtain information about network connections. However, use of such APIs is not free, i.e., they consume a reasonable amount of central processing overhead. Further, a limited amount of information about the network connections, i.e., related to network sockets, is made available through existing APIs. In this regard, conventional server technologies have had some drawbacks with respect to providing access to network socket based information.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
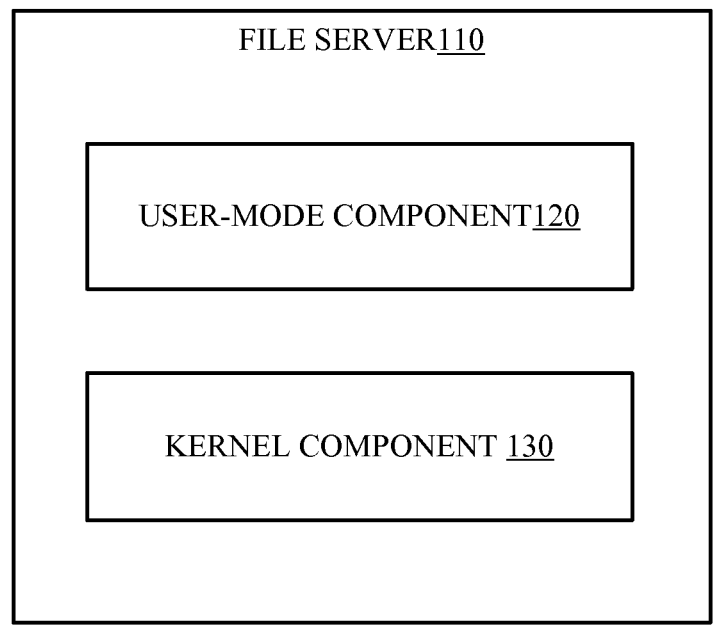
FIG. 1 illustrates a block diagram of a file server associated with an enhanced address domain, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

As described above, conventional server technologies have had some drawbacks with respect to providing limited access to network socket information utilizing existing system calls, and such access can cause central processing unit (CPU) overhead. On the other hand, various embodiments disclosed herein can improve the performance of a server application by generating a new socket type of an enhanced address domain—the new socket type referencing a lower-layer socket of an existing address domain to perform enhanced operations over the existing address domain. In one example, the enhanced operations can comprise allocating a control, or double-mapped, page, which is concurrently mapped in both user space and kernel space, from a user-portion of memory that can store state and other information concerning the enhanced and lower-layer sockets. In this regard, such information can be obtained from a user-mode using a memory read operation—without incurring excessive CPU overhead associated with system calls.

For example, a system, e.g., a file server, network file system (NFS) server, etc. can comprise a processor; and a memory that stores executable instructions that, when executed by the processor, facilitate performance of operations, comprising: generating, creating, etc. an upper-layer socket of an enhanced address domain; allocating a protocol control block (PCB) and associating the PCB with the upper-layer socket—the PCB storing information representing a private state of the upper-layer socket; generating, creating, etc. a lower-layer socket of an existing address domain, e.g., an AF_NET, or address family, supporting Internet protocol version 4 (IPv4), an AF_INET6, or address family, supporting Internet protocol version 6 (IPv6), etc.— the lower-layer socket being accessible, referenced, etc. from the upper-layer socket using the PCB; and installing upcall(s) on the lower-layer socket to be intercepted via the enhanced address domain.

In an embodiment, the creating of the upper-layer socket can comprise creating the upper-layer socket utilizing a socket system call or a kernel socket application programming interface (API). In another embodiment, the creating of the lower-layer socket can comprise creating the lower-layer socket utilizing a socket system call or a kernel socket API In yet another embodiment, the upper-layer socket is programmable, e.g., to support one or more enhancements to the existing address domain and a socket type of the lower-layer-socket, utilizing a socket system call or a kernel socket API.

In one embodiment, such enhancements can comprise maintaining a control page, or double-mapped page of memory, that comprises a collection of state information and other information corresponding to the upper-layer socket and the lower-layer socket. In this regard, the operations can comprise allocating the control page from a user-mode portion of memory, and associating the control page with the upper-layer socket—the control page being made accessible from a user-space comprising the user-mode memory, and being made accessible from a kernel space comprising a protected area of the memory—the kernel space corresponding to an operating system of the file server.

In an embodiment, the operations can further comprise modifying, from the enhanced address domain, the control page with information representing respective states and other related information of the upper-layer socket and the lower-layer socket. For example, the modifying can comprise storing, from the enhanced address domain, such states and information in the control page for later access from a user-mode. In this regard, the operations can further comprise obtaining, e.g., using a memory read operation from the user-mode, the respective states or the other related information from the control page—without using costly system calls. Further, details about network connections previously hidden from user-mode applications can be made available, revealed, etc. to such applications utilizing the control page.

In another embodiment, the operations can further comprise storing, from the user-mode, application, etc. such information as needed by the kernel to implement enhanced socket features.

In yet another embodiment, the modifying can comprise modifying the control page with the information as a consequence of any activity being determined to occur on the upper-layer socket, e.g., a system call, and/or modifying the control page with the information as a consequence of an upcall of the lower-layer socket.

In one embodiment, a method can comprise generating, by a system comprising a processor, e.g., a file server, a first socket of an enhanced address domain; generating, by the system, a PCB from a memory; associating, by the system, the first socket with the PCB for storage of information in the PCB representing a private state of the upper-layer socket; generating, by the system, a second socket of an existing address domain, wherein the second socket is referenced from the first socket using the PCB; and installing, by the system, upcall(s) on the second socket to be intercepted via the enhanced address domain.

In another embodiment, the generating the first socket can comprise generating the first socket utilizing a socket system call or a kernel socket application programming interface. In yet another embodiment, the generating the second socket can comprise generating the second socket utilizing a kernel socket application programming interface.

In an embodiment, the operations can further comprise controlling, by the system, features of the first socket utilizing at least one of a socket system call or a kernel socket application programming interface.

In one embodiment, the operations can further comprise creating, by the system using the first socket, at least one enhancement over the existing address domain. In this regard, in another embodiment, the creating of the at least one enhancement comprises assigning a control page from a user-mode portion of the memory—the control page being made accessible from a user space comprising the user-mode portion of the memory, and from a kernel space comprising a protected portion of the memory; and associating the first socket with the control page.

One embodiment can comprise a computer-readable storage medium comprising instructions that, in response to execution, cause a computing system comprising a processor to perform operations, comprising: generating an upper-layer socket of an enhanced address domain; allocating a PCB from memory; managing information representing a private state of the upper-layer socket in the PCB; associating the PCB with the upper-layer socket; creating a lower-layer socket of an existing address domain—the lower-layer socket being referenced from the upper-layer socket using the PCB; and installing upcall(s) on the lower-layer socket to be intercepted via the enhanced address domain.

In another embodiment, the operations can further comprise allocating a control page from a user-mode portion of the memory, and associating the control page with the upper-layer socket—the control page made accessible from a user space comprising the user-mode memory, and made accessible from a kernel space comprising a protected area of the memory.

In yet another embodiment, the operations can further comprise modifying, from the enhanced address domain, the control page with information representing respective states and other related information of the upper-layer socket and the lower-layer socket.

I. Socket Background

A network socket can be implemented in a kernel address space of an operating system using a socket structure, e.g., socket, struct socket, etc. to support a generic, high-level programming interface for transmitting and receiving data. In this regard, the socket structure is a general abstraction of a connection endpoint, and can manage nearly all of the details that a network application uses to transmit and receive data, e.g., between processes, between devices, etc.

A kernel application, e.g., an NFS server, built into the kernel address space can directly interact with the socket, socket structure, etc. through an address of the socket. On the other hand, since the socket is in the kernel address space, user applications, user-mode applications, e.g., executing within a user space of the operating system, do not have direct access to the socket. In this regard, a user application can use a system call to access a limited amount of information associated with the socket. For example, the user application can refer to the socket via a set of system routines, e.g., socket( ), close( ), bind( ), etc. using an association called a file descriptor, or "fd", which is a unique integer and index within an application's process-specific file descriptor table. The file descriptor table comprises an array of various structures and is included in the kernel address space. An entry in the file descriptor table corresponding to the fd comprises the address of the socket structure.

Consequently, unlike kernel mode applications, which can directly interact with a socket, user-mode applications consume central processing unit (CPU) overhead and have limited access to socket state information utilizing socket system calls.

Each socket has two buffer control substructures, e.g., struct sockbuf, used to manage an ordered list of memory buffers, e.g., struct mbuf. One of the buffer control substructures is used for received data, e.g., receive sockbuf, and the other is used for pending send data, e.g., send sockbuf. Further, each buffer control structure comprises counts, limits, flags, an mbuf listhead element used to manage a variable-length chain of memory buffers (or mbufs), and a small area, e.g., approximately 200-240 bytes, for internal data. In this regard, when more data is needed, the mbufs can be chained together in sequence to form a stream of bytes, or describe an "external buffer" as a separate allocation of memory to store the data.

Further, the kernel socket implementation supports an upcall notification mechanism for the receive sockbuf and send sockbuf portions of the socket. For example, a receive upcall is invoked when data is added to the receive sockbuf, a new connection is ready for acceptance on a listening socket, a peer closes the send side of their socket, and/or an error occurs on the socket. A send upcall is invoked when data leaves the send sockbuf as the result of successful transmission, e.g., indicating data departure and an availability of send sockbuf space; when a notification of connection completion that has been initiated by a call to kernel socket routine soconnect( ) has occurred, and/or an error occurs on the socket.

II. Enhanced Socket Interface

Figure 2:
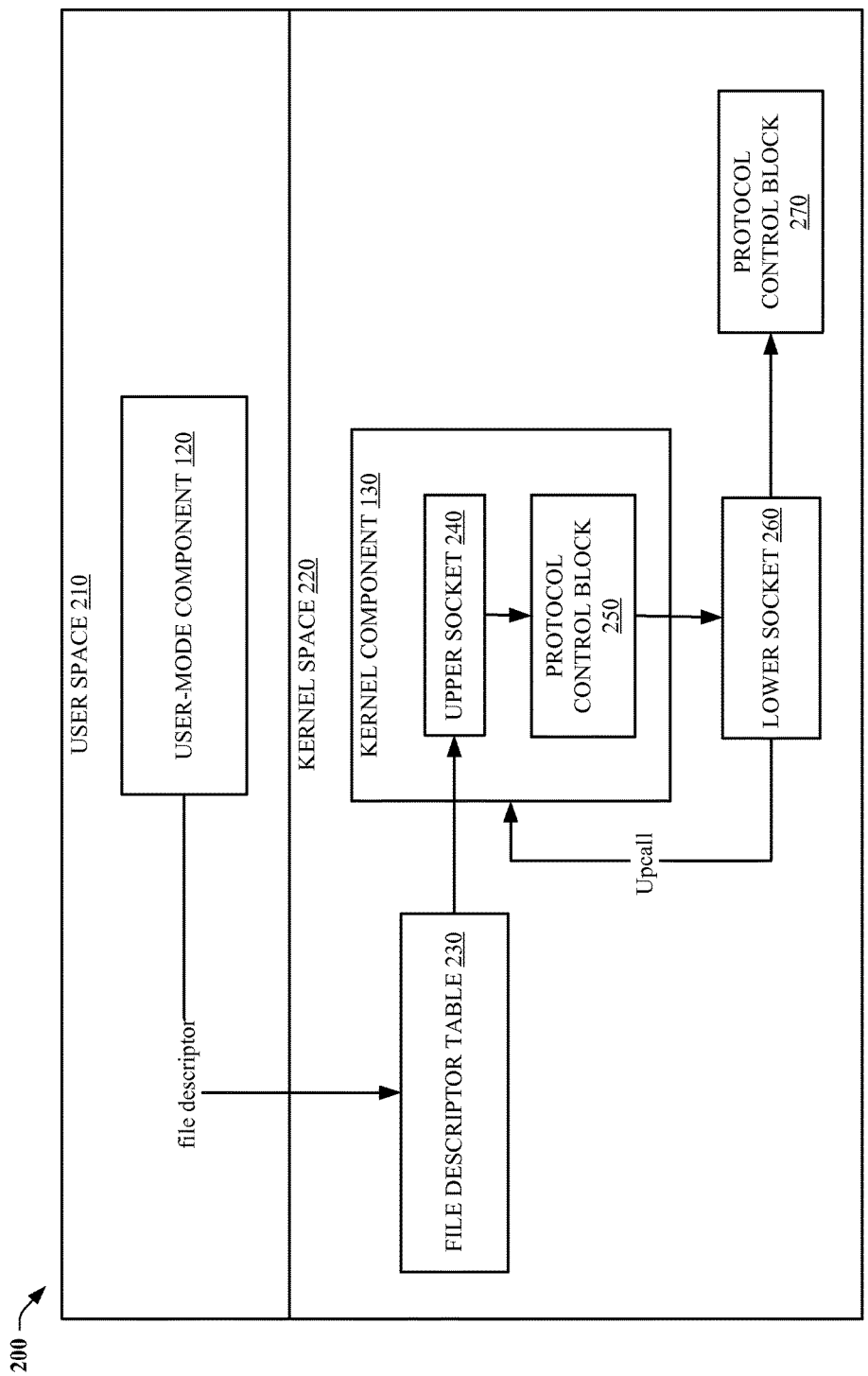
FIG. 2 illustrates a block diagram of another file server associated with an enhanced address domain, in accordance with various embodiments.

Now referring to FIGS. 1 and 2, block diagrams (100, 200) of respective file servers associated with an enhanced address domain are illustrated, in accordance with various embodiments. File server 110 can include user-mode component 120 and kernel mode component 130. User-mode component 120 can be configured to execute user-mode applications via user space 210, e.g., a non-protected, non-fault tolerant, etc. portion of a memory. In this regard, the user-mode applications can interface with kernel component 130 of kernel space 220, e.g., a protected, fault tolerant, etc. portion of the memory, via system calls corresponding to an address family, and the file descriptor, via descriptor table 230.

The address family is a specific address namespace, or domain, used by kernel component 130 to manage connections via sockets. Domains, or address families, support one or more protocols that use the same address format and are mutually exclusive. The address family can be specified in two specific ways: when a socket is created, in which a calling process identifies the address family that the socket will be used in, or by a generic socket address structure, e.g., struct sockaddr, which has an address family field, sa_family, which is used to determine how to interpret the rest of the structure. For example, the INET address family, AF_INET, supports IPv4 with 32-bit addresses; and the structure used with AF_INET is struct sockaddr_in. The INET6 address family, AF_INET6, supports IPv6 with 128-bit addresses; and the structure used with AF_INET6 is the struct sockaddr_in6.

In an embodiment, kernel component 130 can comprise a FreeBSD operating system loadable kernel module (LKM) (not shown). At load time, the FreeBSD LKM can register two Internet protocol address families, or enhanced address domains: AF_INET_ENHANCED and AF_INET6_ENHANCED, e.g., defined in a header, or .h file. In one embodiment, the FreeBSD LKM can be unloaded from kernel space 220 for serviceability—at which time it unregisters such Internet protocol address familys/socket domains. In this regard, each enhanced address domain has a reference count that reflects the number of sockets, enhanced sockets, etc. that are connected with such domain. Therefore, the FreeBSD LKM cannot be unloaded from kernel space 220 if there are any enhanced sockets, e.g., using the enhanced address domains—an attempt to unload the FreeBSD LKM when any of the enhanced sockets are in use will return a function error, e.g., EBUSY.

As described below, sockets generated, created, etc. with AF_INET_ENHANCED and AF_INET6_ENHANCED domains support a custom set of socket options that enable, disable, or establish settings for an enhanced socket interface, e.g., above and beyond existing AF_INET and AF_INET6 socket options. By default, an enhanced socket that is generated, created, etc. via a user mode application using the AF_INET_ENHANCED/AF_INET6_ENHANCED domain, without implementing enhanced functions (see below), will behave as an AF_INET/AF_INET6 socket. In one embodiment, an initial socket( ) system call made within a user mode application can specify an AF_INET_ENHANCED or AF_INET6_ENHANCED domain, and a corresponding socket type is selected via a socket_type parameter of the socket( ) system call.

As illustrated by FIG. 2, upon receiving the intial socket( ) system call from the user mode application, e.g., via an API corresponding to the FreeBSD LKM, kernel component 130 can create upper socket 240 and lower socket 260. Upper socket 240 can comprise an enhanced socket, created using, e.g., the AF_INET_ENHANCED/AF_INET6_ENHANCED domain, and is connected to, referenced by, etc. file descriptor table 230. In this regard, once the user mode application implements the initial socket( ) system call, the user mode application interacts with the enhanced socket—via AF_INET/AF_INET6 based socket addresses and semantics of respective system calls corresponding to the FreeBSD LKM—using a file descriptor that references an entry in file descriptor table 230, the entry comprising the address of upper socket 240.

In embodiment(s), when upper socket 240 is created as an AF_INET_ENHANCED/AF_INET6_ENHANCED socket, kernel component 130 creates, via execution of a protocol attach routine corresponding to upper socket 240, lower socket 260 as a standard AF_INET/AF_INET6 socket, and creates PCB 270 corresponding to lower socket 260—PCB 270 comprising private data corresponding to lower socket 260. Further, kernel component 130 creates, based on the attach routine, PCB 250 corresponding to upper socket 240, and stores an address, e.g., lower socket address 330 of lower socket 260 in PCB 250. In this regard, upper socket 240 interacts with lower socket 260 utilizing the address.

PCB 250 comprises private data, e.g., comprising at least the address of lower socket 260 and additional state and information 340 representing a private state of upper socket 240. In this regard, protocol/domain support routines that are called, executed, etc. via the user mode application utilize the private data during execution. However, lower socket 260 is not accessible via a file descriptor, and the so_flags parameter of lower socket 260 is set to SS_NOFDREF. Therefore, the user mode application does not have direct access to lower socket 260, and lower socket 260 is managed by kernel component 130 as a conventional protocol socket.

In an embodiment, when the user application closes the enhanced socket, kernel component 130 undoes, via execution of a protocol detach routine corresponding to upper socket 240, the established relationships between upper socket 240, PCB 250, and lower socket 260.

As described above, a socket( ) system call can specify a type of socket to be created. In this regard, in embodiment(s), the enhanced address domain comprises at least a datagram protocol socket type and a connection-oriented protocol socket type, e.g., such protocol socket types corresponding to communication between computers over a network, e.g., Internet. The datagram protocol socket type is defined as SOCK_DGRAM, e.g., for supporting an unreliable, unorderd delivery of datagram, e.g., message, data corresponding to UDP, e.g., defined as IPPROTO_UDP. Further, the connection-oriented protocol socket type is defined as SOCK_STREAM, e.g., for supporting a reliable, sequenced stream of guaranteed delivery data corresponding to TCP, e.g., defined as IPPROTO_TCP.

III. Control Page

Figure 3:
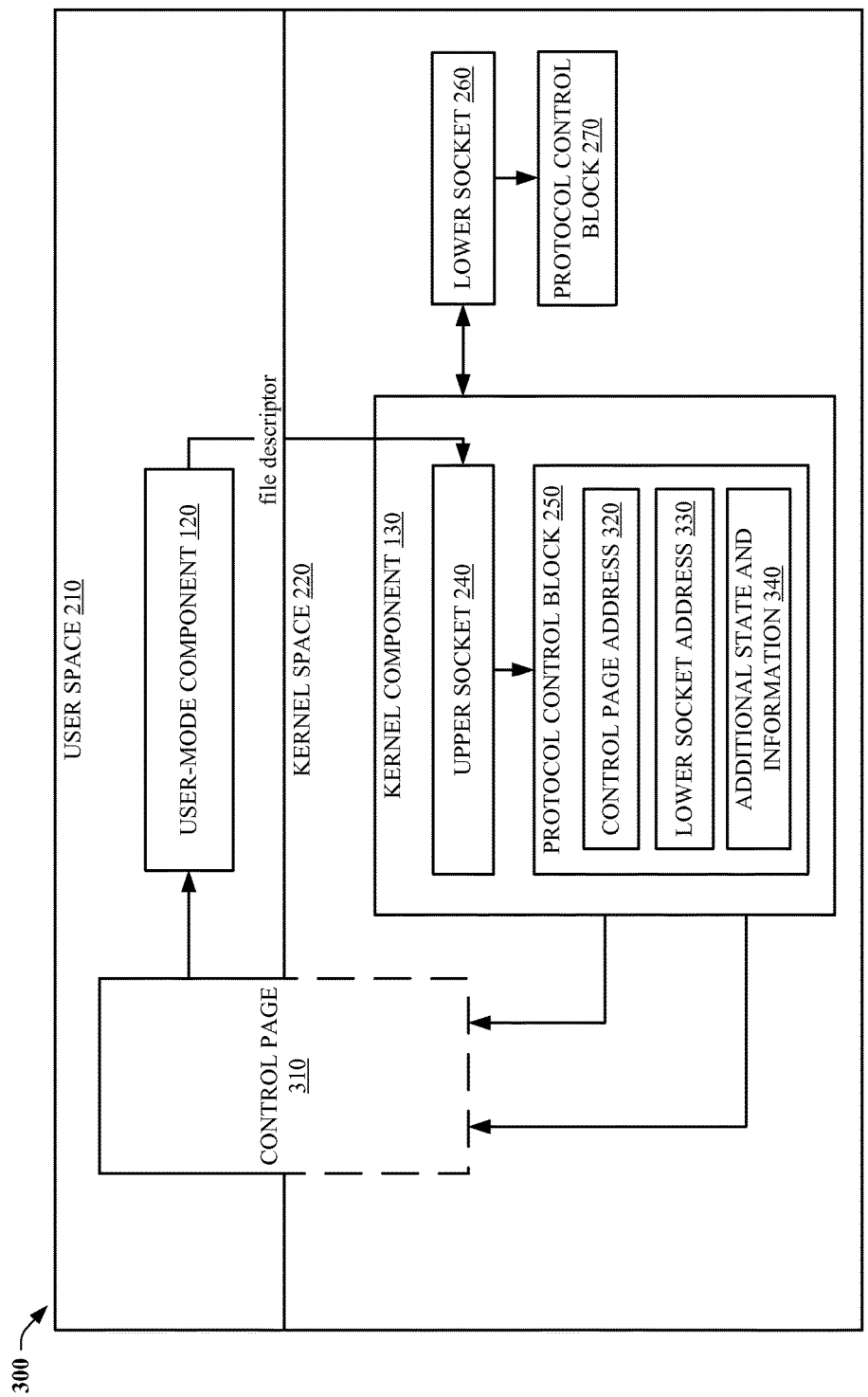
FIG. 3 illustrates a block diagram of a file server including a control page associated with an enhanced address domain, in accordance with various embodiments.

Referring now to FIG. 3, a block diagram (300) of a file server including a control page (310) associated with an enhanced address domain is illustrated, in accordance with various embodiments. Control page (CPAGE) 310 is a page of memory that can be allocated via the user mode application using an mmap( ) system call. In this regard, CPAGE 310 is a read/write page that can be double-mapped to user space 210 and kernel space 220 using a system call, e.g., setsockopt( ) (see below).

Once CPAGE 310 is established, PCB 250 can store control page address 320 for referencing CPAGE 310, and kernel component 130 can update, using control page address 320, CPAGE 310 with socket information, data changes, change of state, etc. corresponding to upper socket 240, lower socket 260, etc. as such changes occur. In this regard, since CPAGE 310 has also been mapped to user space 210, the socket information corresponding to upper socket 240 and/or lower socket 260 can be made available to the user mode application, e.g., via memory read and/or write operation(s), without using a system call. In other embodiments, the socket information can further include control data with respect to details that kernel component 130 manages, e.g., which is not otherwise available to the user application via an existing API.

In an embodiment, a sequence number can be included in CPAGE 310, and incremented after each modification to data of CPAGE 310 has been completed, e.g., providing a lockless method for the user mode application to extract information corresponding to upper socket 240 and lower socket 260, e.g., without fear of fetching data in the middle of an update of CPAGE 310.

IV. Socket Programming

This section is an example implementation of an enhanced socket. As described above, enhanced sockets for the internet protocol are created using the AF_INET_ENHANCED/AF_INET6_ENHANCED address families. Further, once an enhanced socket is created, socket operation behaves as normal AF_NET and AF_INET6 sockets unless the user mode application enables certain options, features, accelerations, etc. In this regard, such options, etc. are enabled through the use of setsockopt( ) and getsockopt( ) system calls corresponding to the FreeBSD LKM.

In one embodiment, an enhanced socket is closed, removed, destroyed, etc. using a close( ) system call. Further, the user mode application does not have to undo any enhanced socket settings prior to closing the enhanced socket, since any association with resources or other sockets are undone as a result of the close( ) system call. In this regard, in embodiment(s), the closure of an enhanced socket results in: disassociation of upper socket 240 from lower socket 260, release of resource(s) owned by lower socket 260, and control page 310 being unmapped from kernel component 130, but remaining in the memory address space.

In embodiment(s), Table I below represents a code excerpt defining a possible implementation of an enhanced socket control data structure that can be exposed to the user mode application via a setsockopt( ) system call, e.g., to set or clear a setting, and/or via a getsockopt( ) system call, e.g., to read the setting.

TABLE I

```
/*
 * ESOCKS protocol socket control structure exposed to
 * the application through SO_ESOCK_CONTROL_DATA.
 */
typedef    struct _esocks_protocol_control {
           esocks_mapping_status_t    ec_mapped_state;
           esocks_sequence_t          ec_sequence_number;
           esocks_sockaddr_t          ec_sockaddr;
           esocks_sockaddr_t          ec_peeraddr;
           uint8_t                    ec_diogenes[256];
} esocks_protocol_control_t;
```

Where:

ec_mapped_status represents the current state of the control data. When successfully mapped, it is set to ESOCKS_IS_MAPPED. When successfully unmapped, it is set to ESOCKS_IS_UNMAPPED.

ec_sequence_number is a value that is incremented each time there is an update to the control data. It is initially set to zero when the data is first mapped and increments to 1 when the area is initialized. This field is especially useful for determining, at a higher level, if any state of the socket has changed.

ec_sockaddr is the local socket address. If sa_len is zero, then there is no local address on the socket.

ec_peeraddr is the remote socket address. For a connected socket, this is the address of the remote socket. If sa_len is zero, then the socket is either UDP or an unconnected TCP.

ec_diogenes[ ] is a buffer containing a copy of a limited amount of the current leading bytes on the receive sockbuf.

In one embodiment, the control data can comprise socket state bits that reflect the status of lower socket 260, e.g., for TCP operations, as described in Table II code excerpt below:

TABLE II

```
/*
 * Socket state bits.
 */
enum {
           ESOCKS_SS_ISCONNECTED       = 0x0002,
           ESOCKS_SS_ISCONNECTING      = 0x0004,
           ESOCKS_SS_ISDISCONNECTING   = 0x0008,
           ESOCKS_SS_ISCONFIRMING      = 0x0400,
           ESOCKS_SS_ISDISCONNECTED    = 0x2000
};
```

Where:

ESOCKS_SS_ISCONNECTED indicates a completed connection.

ESOCKS_SS_ISCONNECTING indicates that the connection is in the process of being established.

ESOCKS_SS_ISDISCONNECTING indicates that the connection is in the process of being torn down.

ESOCKS_SS_ISCONFIRMING provides address domain(s) with an intermediate step in which such address domain(s) can determine whether to accept or reject a connection.

ESOCKS_SS_ISDISCONNECTED indicates that a previously connected socket is now disconnected.

In another embodiment, the control data can include socket state bits corresponding to a receive sockbuf and/or send sockbuf of lower socket 260, as described in Table III code excerpt below:

TABLE III

```
/*
 * Socket buffer state bits.
 */
enum {
           ESOCKS_SBS_CANTSENDMORE     = 0x0010,
           ESOCKS_SBS_CANTRCVMORE      = 0x0020,
           ESOCKS_SBS_RCVATMARK        = 0x0040
};
```

Where:

ESOCKS_SBS_CANTSENDMORE indicates that the send side of the connection is closed down and that no new data can be written. This can only occur if the shutdown( ) system call is used.

ESOCK_SBS_CANTRCVMORE indicates that the receive side of the connection is closed down and that no new data can be received. This can occur if the shutdown( ) system call is used or if the peer has initiated the close of the connection.

ESOCKS_SBS_RCVATMARK indicates that the stream is currently at the position of an out-of-band character.

In yet another embodiment, a mapping status of a mapped page, e.g., CPAGE 310, can be defined as described in Table IV code excerpt below:

TABLE IV

```
/*
 * Mapping status, either mapped or not.
 */
typedef enum {
        ESOCKS_IS_UNMAPPED   = 0,
        ESOCKS_IS_MAPPED     = 1
} esock_mapped_t;
```

Where:

ESOCKS_IS_UNMAPPED indicates that the underlying mappable page is currently not mapped.

ESOCKS_IS_MAPPED indicates that the underlying mappable page is currently mapped.

In one embodiment, socket options can be enabled or disabled based on the definitions described in Table V code excerpt below:

TABLE V

```
enum {
        ESOCKS_OPTION_OFF = 0,
        ESOCKS_OPTION_ON  = 1
} esocks_option_offon_t;
```

Where:

ESOCKS_OPTION_OFF is used to turn or indicate that a Boolean option is disabled.

ESOCKS_OPTION_ON is used to turn or indicate that a Boolean option is enabled.

In another embodiment, enhanced sockets can be defined, and socket address data can be accessed, via a special union described in Table IV code excerpt below:

TABLE VI

```
/*
 * Supported address types.
 * (Doesn't use sockaddr_storage to save space.)
 */
typedef union {
        struct sockaddr       sa;
        struct sockaddr_in    sin;
        struct sockaddr_in6   sin6;
} esocks_sockaddr_t;
```

Where:

esocks_sockaddr_t is the type that describes the possible socket address formats:

sa is the default, generic socket address type.

sin is the socket address format for AF_INET sockets.

sin6 is the socket address format for AF_INET6 sockets.

In another embodiment, Table VII below represents an example code excerpt for creating an enhanced socket and a double-mapped control page, e.g., CPAGE 310, and associating the double-mapped control page with the enhanced socket to enable access of information, state information, data, etc. associated with the enhanced socket, e.g., associated with lower socket 260, upper socket 240, etc. For example, in embodiment(s), the user space application can execute memory reference(s), e.g., read operation(s), directed to the double-mapped control page.

TABLE VII

```
#include <sys/socket.h>
#include <netinet/in.h>
#include <arpa/inet.h>
#include <sys/isi_esocks.h>
#include <sys/mman.h>
#include <stdio.h>
#include <stdlib.h>
#include <string.h>
#include <unistd.h>
int main(int argc, char **argv) {
    esock_control_t *ecp;
    int fd;
    /*
     * Create the enhanced socket. If not loaded, this will fail.
     */
    fd = socket(AF_INET_ENHANCED, SOCK_STREAM,
        IPPROTO_TCP);
    if (fd < 0) {
        if (errno == EPROTONOSUPPORT) {
            printf("Enhanced sockets not available\n");
            exit(1);
        }
        perror("socket( )");
        exit(1);
    }
    /*
     * Allocate a page of memory with read/write access.
     */
    ecp = (esock_control_t *) mmap(NULL, 4096,
        PROT_READ|PROT_WRITE,
        MAP_ANON|MAP_SHARED, -1, (off_t) 0);
    if (ecp === NULL) {
        perror("mmap( )");
        exit(1);
    }
    printf("Before mapping page to socket: control page is %s\n",
        ecp->ec_mapped_state == ESOCKS_IS_MAPPED ?
        "mapped" : "unmapped");
    /*
     * Associate the page with the socket.
     */
    if (setsockopt(fd, SOL_ESOCKET, SO_ESOCK_CONTROLPAGE,
        &ec, sizeof(ec)) < 0) {
        perror("setsockopt( )");
        exit(1);
    }
    printf("After mapping page to socket: control page is %s\n",
        ecp->ec_mapped_state == ESOCKS_IS_MAPPED ?
        "mapped" : "unmapped");
    /* INSERT OTHER CODE HERE */
    /*
     * Close the socket. Control page disassociates automatically.
     */
    close(fd);
    printf("After closing socket: control page is %s\n",
        ecp->ec_mapped_state == ESOCKS_IS_MAPPED ?
        "mapped" : "unmapped");
    exit(0);
}
```

In an embodiment, in the event the AF_INET_ENHANCED/AF_INET6_ENHANCED address families, enhanced address domains, etc. are not loaded into kernel space 220, e.g., via the FreeBSD LKM, an attempt to create a socket from the user mode application using the enhanced socket address, domain, etc. identifiers will fail with an error defined as EPROTONOSUPPORT.

In another embodiment, the mmap( ) system call will produce a page of zeroes. When successfully mapped to the socket, the ec_map_state field of the control data will change from ESOCKS_IS_UNMAPPED to ESOCKS_IS_MAPPED.

FIGS. 4-10 illustrate methodologies in accordance with the disclosed subject matter. For simplicity of explanation, the methodologies are depicted and described as a series of acts. It is to be understood and appreciated that various embodiments disclosed herein are not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 4:
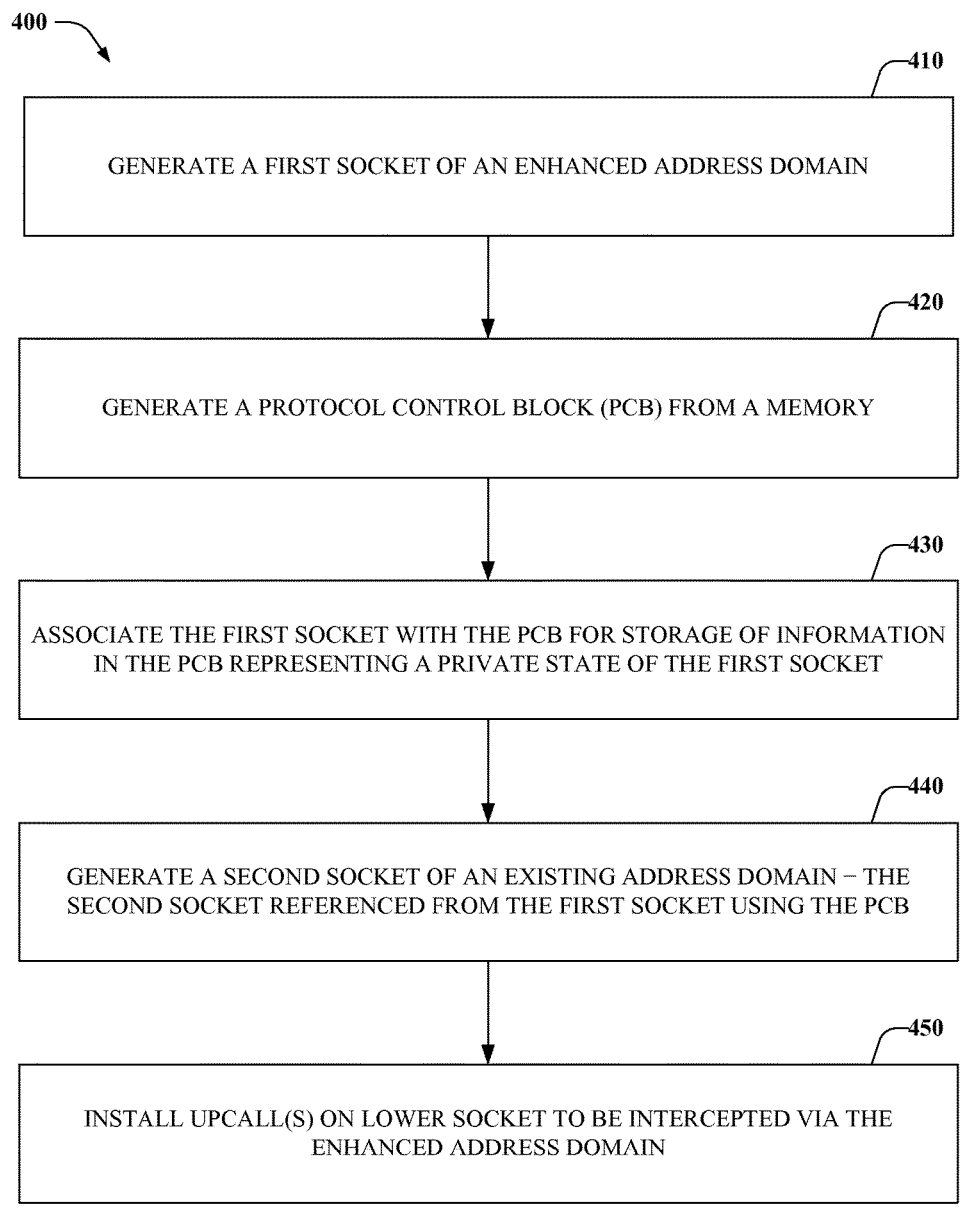
FIG. 4 illustrates a flowchart of a method associated with an enhanced address domain, in accordance with various embodiments.

FIG. 4 illustrates process 400 performed by file server 110, e.g., associated with an enhanced address domain, in accordance with various embodiments. At 410, a first socket, e.g., upper level socket, of the enhanced address domain can be generated. At 420, a PCB can be generated from a memory, e.g., file server 110. At 430, the first socket can be associated with the PCB for storage of information in the PCB representing a private state of the first socket. A 440, a second socket, e.g., lower level socket, of an existing address domain can be generated—the second socket being referenced from the first socket using the PCB. At 450, upcall(s) can be installed on the second socket, e.g., lower level socket, to be intercepted via the enhanced address domain. In this regard, in embodiment(s), the enhanced address domain can read data from the second socket in response detecting the upcall(s), detecting a state change based on the upcall(s), etc.

Figure 5:
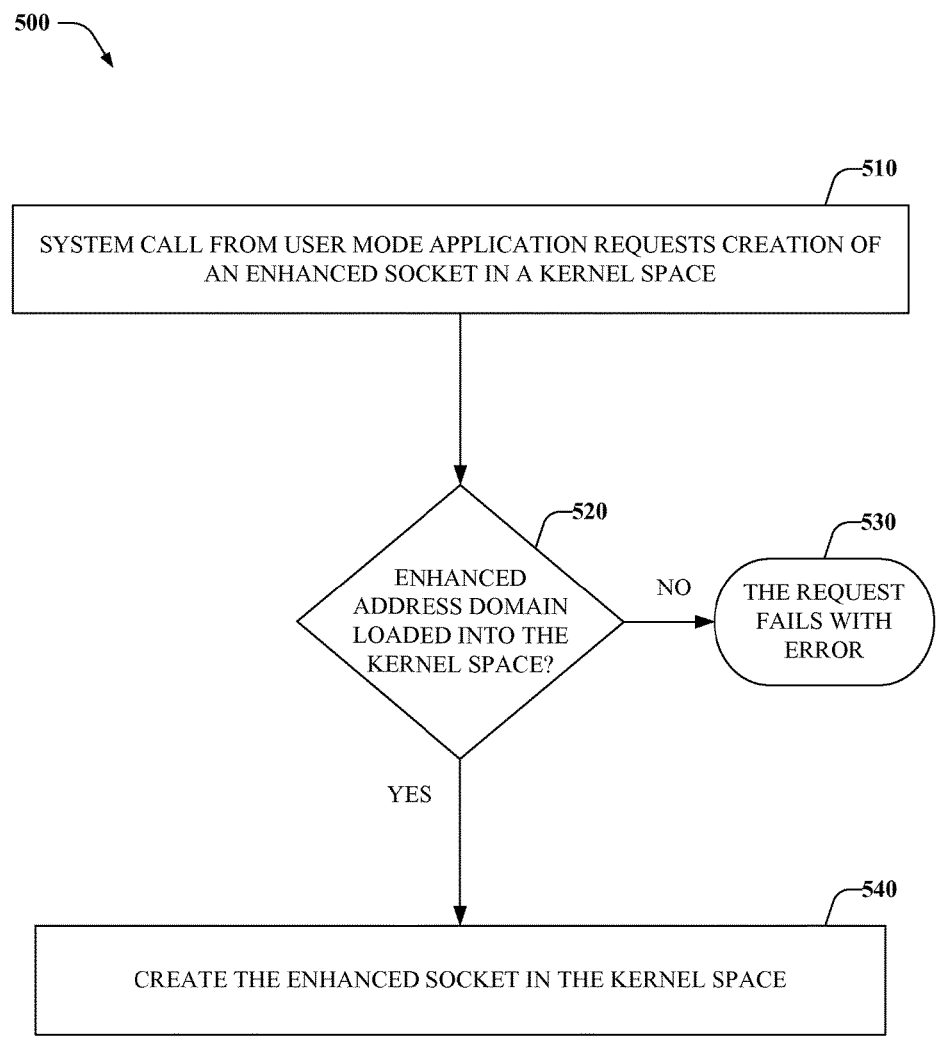
FIG. 5 illustrates a flowchart of another method associated with an enhanced address domain, in accordance with various embodiments.

FIG. 5 illustrates a flowchart (500) of another method performed by file server 110, e.g., associated with an enhanced address domain, in accordance with various embodiments. At 510, a system call from a user mode application can request creation of an enhanced socket in a kernel space. At 520, it can be determined whether an enhanced address domain has been loaded into the kernel space, e.g., via a header, or *.h file defining Internet protocol address families, e.g., enhanced address domains AF_INET_ENHANCED and/or AF_INET6_ENHANCED.

In this regard, if it has been determined, at 520, that the enhanced address domain has not been loaded into the kernel space, then file server 110 fails the request and produces an error, error message, etc. at 530; otherwise, flow continues to 540, at which the enhanced socket can be created in the kernel space.

Figure 6:
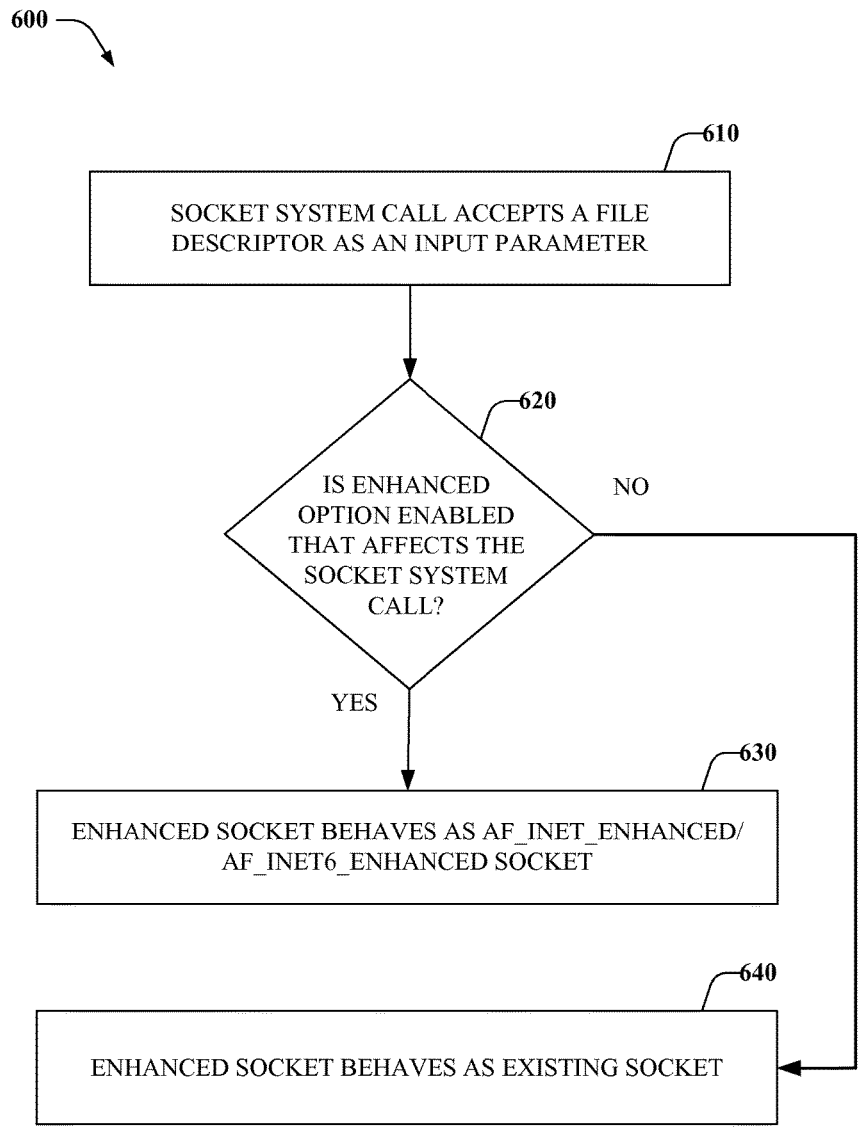
FIG. 6 illustrates a flowchart of yet another method associated with an enhanced address domain.

FIG. 6 illustrates a flow chart (600) of yet another method performed by file server 110, e.g., associated with an enhanced address domain, in accordance with various embodiments. At 610, a socket system call, e.g., bind( ), listen( ), connect( ), accept( ), etc. accepts a file descriptor as an input parameter. At 620, it can be determined whether an enhanced option is enabled that affects the socket system call.

In this regard, if it has been determined that the enhanced option is enabled, flow continues to 630, at which the enhanced socket behaves as an AF_INET_ENHANCED socket or an AF_INET6_ENHANCED socket; otherwise, flow continues to 640, at which the enhanced socket behaves as an AF_NET socket or an AF_INET6 socket.

Figure 7:
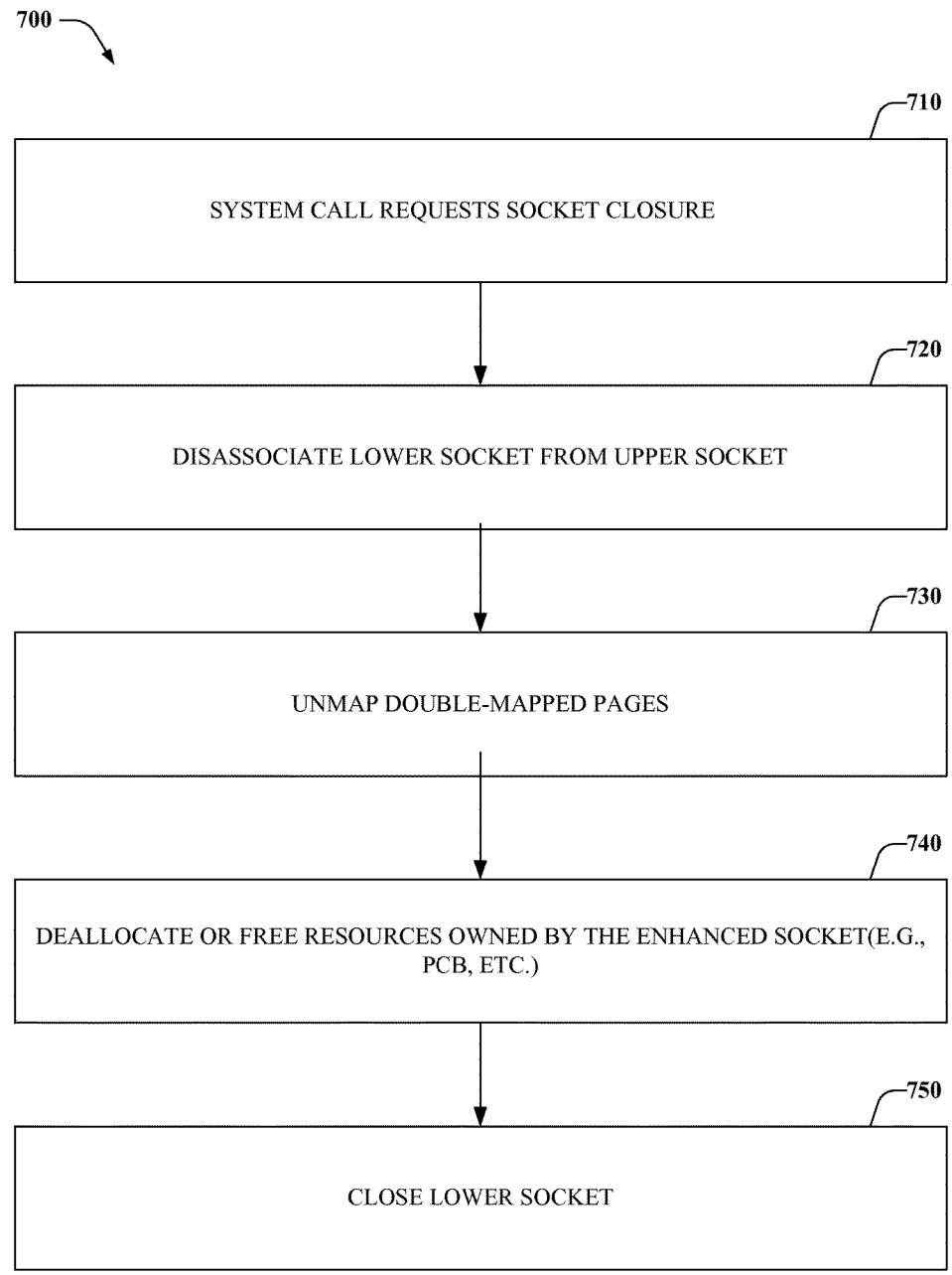
FIG. 7 illustrates a flowchart of a method associated with closure of an enhanced socket, in accordance with various embodiments.

FIG. 7 illustrates a flowchart (700) of a method performed by file server 110 associated with closure of an enhanced protocol socket, in accordance with various embodiments. At 710, a close( ) system call requests a socket closure. At 720, a corresponding lower socket can be disassociated from an upper socket. At 730, double-mapped pages can be unmapped. At 740, resources owned by the enhanced socket, e.g., a PCB corresponding to the enhanced socket, can be deallocated or freed. At 750, the lower socket can be closed.

Figure 8:
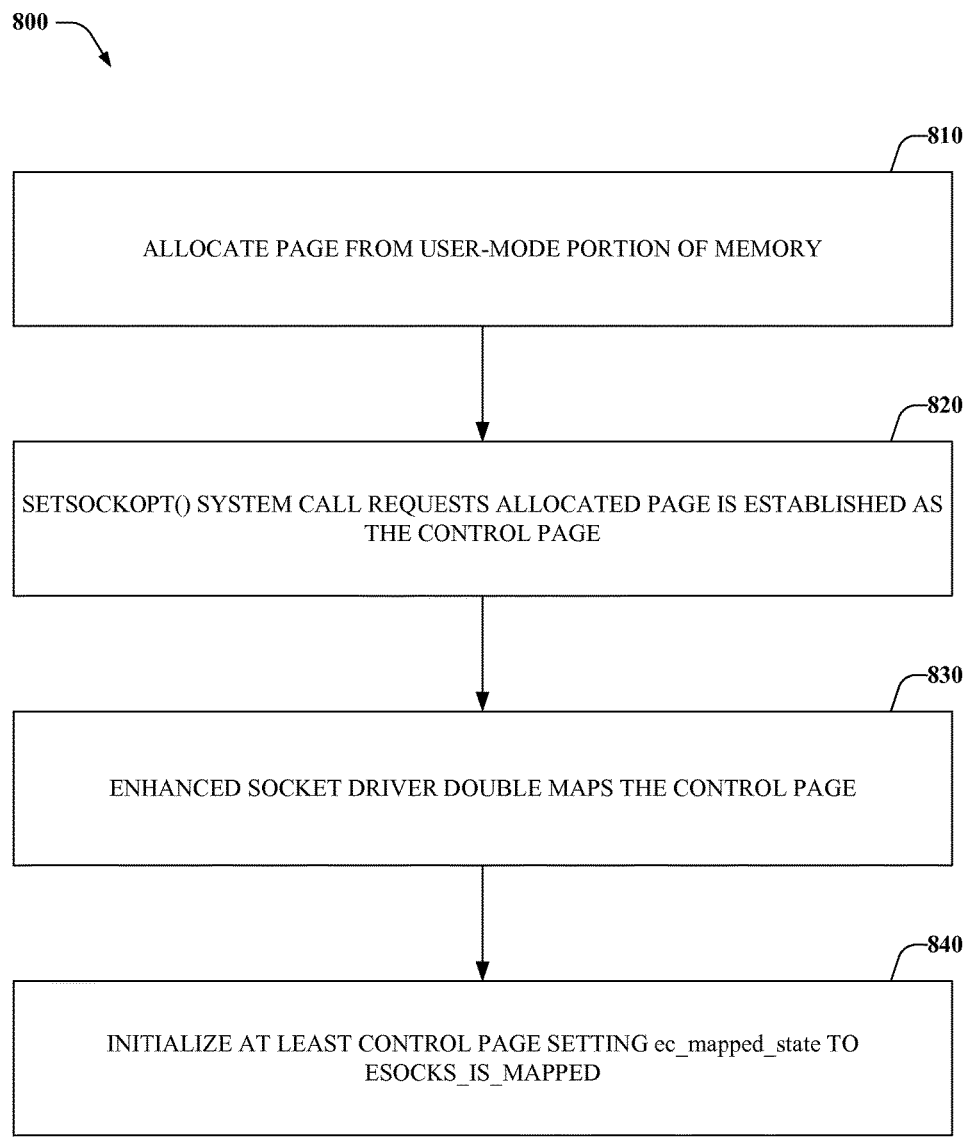
FIG. 8 illustrates a flowchart of a method associated with creation of a control page, in accordance with various embodiments.

FIG. 8 illustrates a flowchart (800) of a method performed by file server 110 associated with creation of a control page, in accordance with various embodiments. At 810, a page can be allocated from a user-mode portion of a memory. At 820, a setsockopt( ) system call requests the allocated page be established as the control page. At 830, an enhanced socket driver double maps the control page. At 840, at least one control page field is initialized, e.g., ec_mapped_state is set to ESOCKS_IS_MAPPED.

Figure 9:
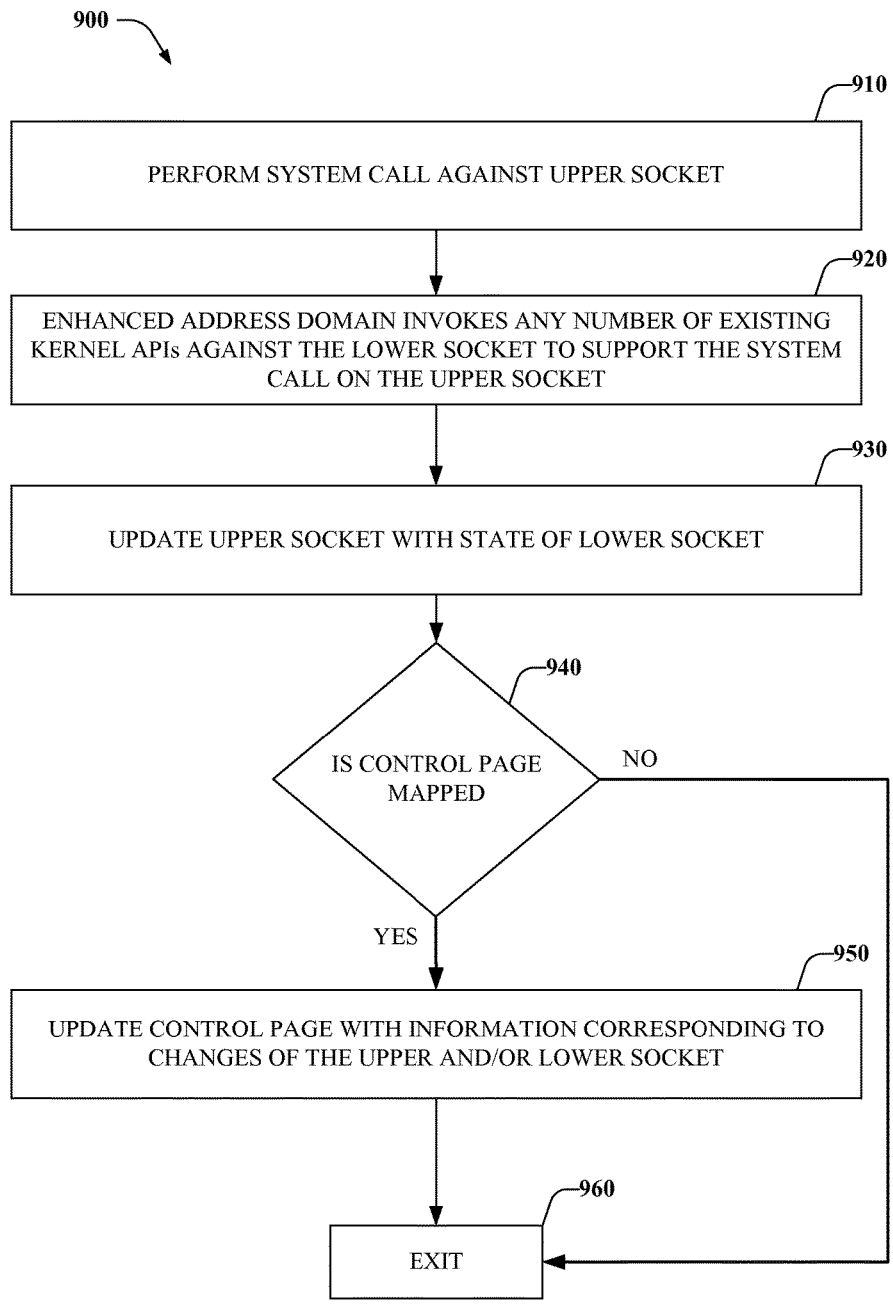
FIG. 9 illustrates a flowchart of a method associated with updating a control page, in accordance with various embodiments.

FIG. 9 illustrates a flowchart (900) of a method performed by file server 110 associated with updating a control page, in accordance with various embodiments. At 910, a system call can be performed against an upper socket, upper level socket, etc. At 920, an enhanced address domain can invoke any number of existing kernel APIs against the lower socket to support the system call on the upper socket. At 930, the upper socket can be updated with a state of the lower socket. At 940, it can be determined whether the control page has been mapped. In this regard, if the control page has been mapped, flow continues to 950, at which the control page can be updated with information corresponding to changes of the upper and/or lower socket; otherwise, flow continues to 960.

Figure 10:
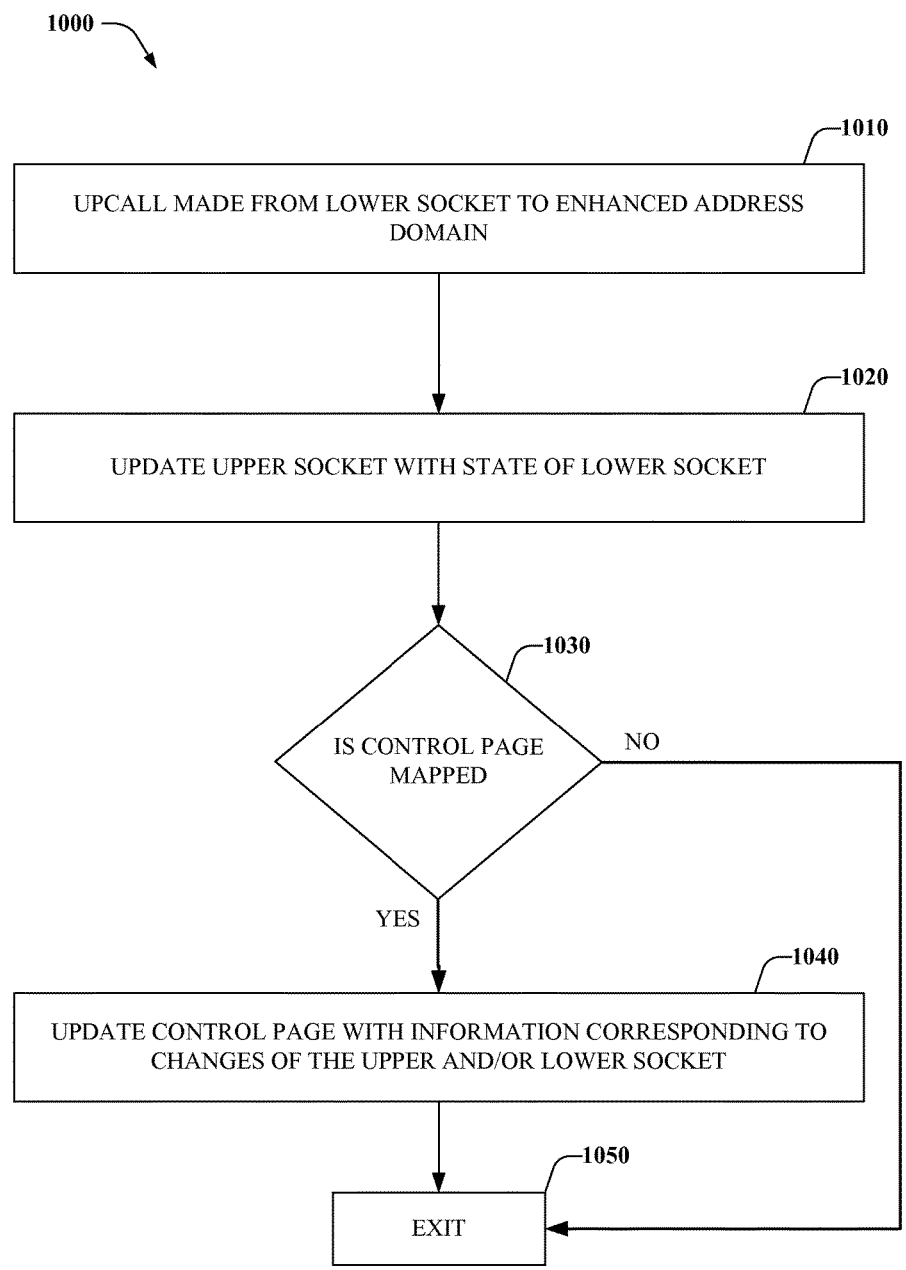
FIG. 10 illustrates a flow chart of another method associated with updating a control page, in accordance with various embodiments.

FIG. 10 illustrates a flow chart of another method associated with updating a control page, in accordance with various embodiments. At 1010, an upcall can be made from the lower socket to the enhanced address domain. At 1020, the upper socket can be updated with a state of the lower socket. At 1030, it can be determined whether the control page has been mapped. In this regard, if the control page has been mapped, flow continues to 1040, at which the control page can be updated with information corresponding to changes of the upper and/or lower socket; otherwise, flow continues to 1050.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "function", "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to, magnetic storage devices, e.g., hard disk; floppy disk; magnetic strip(s); optical disk (e.g., compact disk (CD), digital video disc (DVD), Blu-ray Disc (BD)); smart card(s); and flash memory device(s) (e.g., card, stick, key drive); and/or a virtual device that emulates a storage device and/or any of the above computer-readable media.

In accordance with various embodiments, processor(s) for implementing embodiments disclosed herein can comprise distributed processing devices, or parallel processing devices, in a single machine, device, etc., or across multiple machines, devices, etc. Furthermore, the processor(s) can comprise a state machine, an application specific integrated circuit (ASIC), or a programmable gate array (PGA), e.g., field PGA (FPGA). In this regard, when the processor(s) execute instruction(s) to perform "operations", the processor(s) can perform the operations directly, and/or facilitate, direct, or cooperate with other device(s) and/or component(s) to perform the operations.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium", and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in non-volatile memory 1122 (see below), disk storage 1124 (see below), and/or memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory 1120 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
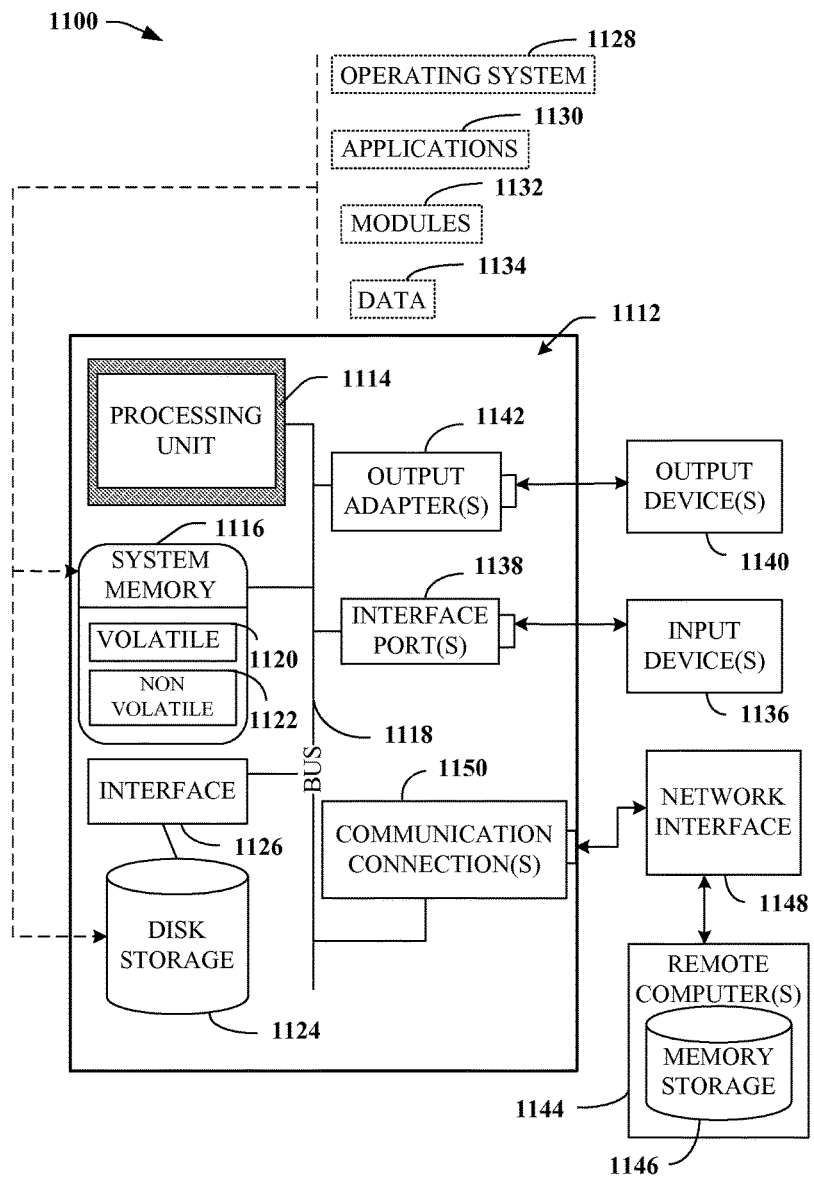
FIG. 11 is a block diagram representing an illustrative non-limiting computing system or operating environment in which one or more aspects of various embodiments described herein can be implemented.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

With reference to FIG. 11, a block diagram of a computing system 1100, e.g., file system 110, operable to execute the disclosed systems and methods is illustrated, in accordance with an embodiment. Computer 1112 comprises a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1116 comprises volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can comprise ROM, PROM, EPROM, EEPROM, or flash memory. Volatile memory 1120 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also comprises removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information into computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1114 through system bus 1118 via interface port(s) 1138. Interface port(s) 1138 comprise, for example, a serial port, a parallel port, a game port, a universal serial bus (USB), a wireless based port, e.g., Wi-Fi, Bluetooth, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140, like display devices, light projection devices, monitors, speakers, and printers, among other output devices 1140, which use special adapters. Output adapters 1142 comprise, by way of illustration and not limitation, video and sound devices, cards, etc. that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically comprises many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically and/or wirelessly connected via communication connection 1150. Network interface 1148 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and DSL modems, wireless modems, ISDN adapters, and Ethernet cards.

The computer 1112 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1112 can connect to other devices/networks by way of antenna, port, network interface adaptor, wireless access point, modem, and/or the like.

The computer 1112 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   a processor; and
   a memory that stores executable instructions that, when executed by the processor, facilitate performance of operations, comprising:
   creating an upper-layer socket of an enhanced address domain;
   creating a lower-layer socket of an existing address domain;
   allocating a protocol control block in the memory that stores information representing an address of the lower-layer socket and a first state of the upper-layer socket with respect to a first use of the upper-layer socket;
   installing one or more upcalls on the lower-layer socket to be intercepted via the enhanced address domain, wherein the one or more upcalls correspond to a second use of the lower-layer socket; and
   in response to determining that an upcall of the one or more upcalls has been intercepted, updating the upper-layer socket with a second state of the lower-layer socket, wherein the second state of the lower-layer socket has been stored in a control page that is accessible from a user space comprising a user-mode portion of the memory, and wherein the control page is accessible from a kernel space comprising a protected area of the memory.

2. The system of claim 1, wherein the creating of the upper-layer socket comprises creating the upper-layer socket via a socket system call or a kernel socket application programming interface.

3. The system of claim 1, wherein the creating of the lower-layer socket comprises creating the lower-layer socket via a kernel socket application programming interface.

4. The system of claim 1, wherein the lower-layer socket is accessible from the upper-layer socket.

5. The system of claim 1, wherein the upper-layer socket is programmable via a socket system call or a kernel socket application programming interface.

6. The system of claim 1, wherein the existing address domain comprises at least one of an AF_INET address domain or an AF_INET6 address domain.

7. The system of claim 1, wherein the upper-layer socket supports one or more enhancements to the existing address domain and a socket type of the lower-layer socket.

8. The system of claim 7, wherein the one or more enhancements comprise maintaining the control page comprising:
- allocating the control page from the user-mode portion of the memory; and
- associating the control page with the upper-layer socket.

9. The system of claim 7, wherein the one or more enhancements comprise maintaining the control page, wherein the control page comprises a collection of state information and other information, wherein the state information and the other information correspond to the upper-layer socket and the lower-layer socket, and wherein the state information comprises the first state and the second state.

10. The system of claim 1, wherein the operations further comprise:
- modifying, from the enhanced address domain, the control page with information representing respective states and other related information of the upper-layer socket and the lower-layer socket, and wherein the respective states comprise the first state of the upper-layer socket and the second state of the lower-layer socket.

11. The system of claim 10, wherein the operations further comprise:
- obtaining, from a user-mode portion of the memory, the respective states or the other related information from the control page.

12. A method, comprising:
- generating, by a system comprising a processor, a first socket of an enhanced address domain and a second socket of an existing address domain;
- generating, by the system, a protocol control block (PCB) from a memory;
- storing, by the system in the PCB, information representing an address of the second socket and a first state corresponding to a first utilization of the first socket;
- installing, by the system, at least one upcall on the second socket to be intercepted via the enhanced address domain in response to a second utilization of the second socket; and
- in response to intercepting an upcall of the at least one upcall, modifying the first socket based on a second state of the second socket, wherein the second state has been stored in a control page that is accessible from a user space comprising a user-mode portion of the memory, and wherein the control page is accessible from a kernel space comprising a protected area of the memory.

13. The method of claim 12, wherein the generating the first socket comprises generating the first socket utilizing a socket system call or a kernel socket application programming interface.

14. The method of claim 12, wherein the generating the second socket comprises generating the second socket utilizing a kernel socket application programming interface.

15. The method of claim 12, wherein the operations further comprise:
- controlling, by the system, features of the first socket utilizing at least one of a socket system call or a kernel socket application programming interface.

16. The method of claim 12, wherein the operations further comprise:
- creating, by the system using the first socket, at least one enhancement over the existing address domain.

17. The method of claim 16, wherein the creating of the at least one enhancement comprises:
- assigning the control page from the user-mode portion of the memory; and
- associating the first socket with the control page.

18. A computer-readable storage medium comprising instructions that, in response to execution, cause a computing system comprising a processor to perform operations, comprising:
- generating an upper-layer socket of an enhanced address domain;
- generating a lower-layer socket of an existing address domain;
- allocating a protocol control block (PCB) from memory;
- storing, in the PCB, information representing an address of the lower-layer socket and a private state of the upper-layer socket with respect to a use of the upper-layer socket; and
- installing one or more upcalls on the lower-layer socket to be intercepted via the enhanced address domain, wherein an interception of an upcall of the one or more upcalls comprises updating the upper-layer socket as a function of a state of the lower-layer socket that has been stored in a control page that has been allocated from a user-mode portion of the memory, wherein the state of the lower-layer socket is accessible from the user-mode portion of the memory, and wherein the state of the lower-layer socket is accessible from a kernel space comprising a protected area of the memory.

19. The computer-readable storage medium of claim 18, wherein the operations further comprise:
- allocating the control page from the user-mode portion of the memory; and
- associating the control page with the upper-layer socket.

20. The computer-readable storage medium of claim 19, wherein the operations further comprise:
- modifying, from the enhanced address domain, the control page with information representing respective states and other related information of the upper-layer socket and the lower-layer socket, and wherein the respective states comprise the state of the lower-layer socket.

* * * * *